US011982978B2

(12) United States Patent
Loetscher

(10) Patent No.: US 11,982,978 B2
(45) Date of Patent: May 14, 2024

(54) SYSTEM FOR FASTENING A HOROLOGICAL MOVEMENT IN A WATCH CASE

(71) Applicant: Omega SA, Biel/Bienne (CH)

(72) Inventor: Philippe Loetscher, Evilard (CH)

(73) Assignee: Omega SA, Biel/Bienne (CH)

( * ) Notice: Subject to any disclaimer, the term of this patent is extended or adjusted under 35 U.S.C. 154(b) by 322 days.

(21) Appl. No.: 17/220,263

(22) Filed: Apr. 1, 2021

(65) Prior Publication Data

US 2022/0083009 A1 Mar. 17, 2022

(30) Foreign Application Priority Data

Sep. 15, 2020 (EP) .................................... 20196111

(51) Int. Cl.
*G04B 37/05* (2006.01)
*G04B 29/04* (2006.01)

(52) U.S. Cl.
CPC ............. *G04B 37/05* (2013.01); *G04B 29/04* (2013.01)

(58) Field of Classification Search
CPC ................................ G04B 37/05; G04B 29/04
See application file for complete search history.

(56) References Cited

U.S. PATENT DOCUMENTS 707,430 A 8/1902 Kuhn
872,712 A * 12/1907 Church .................. G04B 37/05 368/300
3,633,356 A * 1/1972 Kitazima ............. G04B 37/052 368/299
2013/0128707 A1* 5/2013 Mertenat ................ G04B 37/05 368/309

FOREIGN PATENT DOCUMENTS

CH 257462 A 10/1948
CH 645 770 A 10/1984
CN 1048108 A 12/1990
CN 104808472 A 7/2015
EP 1 241 541 A1 9/2002
(Continued)

OTHER PUBLICATIONS

Notice of the Reason for Refusal dated Mar. 29, 2022 in Japanese Patent Application No. 2021-073040 (with English language translation), 7 pages.

(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A system for fastening a horological movement of generally circular shape in a watch case, this fastening system including a casing ring wherein the horological movement is disposed, the casing ring extending between an upper portion and a lower portion, the horological movement being fastened in the lower portion of the casing ring using a first and a second fastening device disposed at two opposite ends of a diameter of the horological movement, at least a third fastening device, angularly offset relative to the first and second fastening device and fastened in the upper portion of the casing ring, allowing the horological movement to be blocked in the casing ring.

9 Claims, 4 Drawing Sheets

(56) References Cited

FOREIGN PATENT DOCUMENTS

| | | | | |
|---|---|---|---|---|
| EP | 2 595 007 | A1 | | 5/2013 |
| GB | 177165 | A | * | 1/1923 |
| JP | 47-31679 | | | 12/1972 |
| JP | 50-44770 | | | 12/1975 |
| JP | 53-70252 | | | 6/1978 |
| JP | 2013-108978 | A | | 6/2013 |

OTHER PUBLICATIONS

Combined Chinese Office Action and Search Report dated Dec. 19, 2022 in Chinese Patent Application No. 202111080362.2, 6 pages.
European Search Report dated Feb. 1, 2021 in European Application 20196111.7 filed Sep. 15, 2020 (with English Translation of Categories of Cited Documents), 3 pages.
Korean Office Action dated May 16, 2023 in Korean Application 10-2021-0058063, (with English translation), 12 pages.
Japanese Office Action dated Jun. 27, 2023 in Japanese Patent Application No. 2022-104668 (with English translation), 5 pages.

* cited by examiner

SYSTEM FOR FASTENING A HOROLOGICAL MOVEMENT IN A WATCH CASE

CROSS-REFERENCE TO RELATED APPLICATION

This application claims priority to European Patent Application No. 20196111.7 filed on Sep. 15, 2020, the entire disclosure of which is hereby incorporated herein by reference.

TECHNICAL FIELD OF THE INVENTION

The present invention relates to a system for fastening a horological movement in a watch case. More specifically, the present invention relates to a system allowing to immobilise a horological movement arranged in a casing ring disposed in the case of a watch.

TECHNOLOGICAL BACKGROUND OF THE INVENTION

Timepieces, in particular wristwatches, conventionally include a middle closed at the bottom by a back. Together, these two elements—middle and back—form a watch case which delimits an interior volume wherein a horological movement is housed, also called a calibre. Towards the top, the watch case is surmounted by a dial protected by a crystal.

Depending on the case, such a horological movement is arranged in the interior volume of the watch case either directly or by means of a casing ring wherein the horological movement is embedded, the assembly formed by the horological movement and the casing ring then being housed in the watch case.

The immobilisation of the horological movement in the watch case is frequently ensured by two screws or only by two screw-flange assemblies. These screws or screw-flange assemblies allow to fasten the horological movement either directly on the middle or on the casing ring. Usually, these fastening elements are disposed at two opposite ends of a diameter of the horological movement which, in practice, has not always proved very appropriate. Indeed, the diameter of the horological movement on which the screws or the assemblies formed by screws and flanges are disposed forms an axis around which the horological movement and, where appropriate, the casing ring wherein the horological movement is disposed, are capable of pivoting in the event of an impact applied to the watch. Of course, such a pivoting of the horological movement or of the horological movement/casing ring assembly inside the watch case is to be avoided because it can cause significant damage to some components of the watch such as the shafts of the winding or correction crowns which may be distorted or the feet of the dial which may break. Some cases wherein the dial was bent were even seen.

SUMMARY OF THE INVENTION

The objective of the present invention is to overcome the aforementioned problems as well as others still by providing a fastening system allowing to guarantee total immobility of a horological movement in a watch case, in particular in the event of impacts applied to such a watch case.

To this end, according to a first aspect, the object of the present invention is a system for fastening a horological movement of generally circular shape in a watch case, this fastening system comprising a casing ring wherein the horological movement is disposed, the casing ring extending between an upper portion and a lower portion, the horological movement being fastened in the lower portion of the casing ring using a first and a second fastening means disposed at two opposite ends of a diameter of the horological movement, at least a third fastening means, angularly offset relative to the first and second fastening means and fastened in the upper portion of the casing ring, allowing the horological movement to be blocked in the casing ring.

According to a special embodiment of the invention, the fastening system comprises a holding part, the horological movement being sandwiched between this holding part and the casing ring, the holding part being fastened on the casing ring using the at least a third fastening means.

According to another special embodiment of the invention, the third fastening means is angularly offset by 90° relative to the first and second fastening means disposed at the opposite ends of a diameter of the horological movement.

Thanks to these features, the present invention provides a system for fastening a horological movement in a casing ring of a watch case which guarantees a rigid connection between the horological movement and the watch case, so as to prevent any untimely movement of the horological movement inside the watch case in the event of an impact applied to the watch. Indeed, by providing at the top of the casing ring at least a third fastening means which is angularly offset relative to the diameter line which interconnects the first and second means for fastening the horological movement to this same casing ring, any possibility of pivoting of the horological movement relative to the watch case in the event of an impact is prohibited. The risks of distorting the shafts of the winding or correction crowns which, from the outside of the watch, allow the owner of this watch to act on the horological movement, are thus avoided. This also avoids the risks of breaking the feet of the dial, or even that the dial bends, a situation that is irremediable when dealing with an old watch for which spare parts are no longer available. The immobilisation of the horological movement inside the casing ring is further improved by sandwiching this horological movement between the casing ring and a holding part which is immobilised by means of the third fastening means.

An object of the present invention is also a system for fastening a horological movement of generally circular shape in a watch case, this fastening system comprising a casing ring wherein the horological movement is disposed, the casing ring extending between an upper portion and a lower portion, the horological movement being blocked in the casing ring by means of a first, a second and a third fastening means which are angularly spaced and fastened in the upper portion of this casing ring.

According to a special embodiment of the invention, the fastening system comprises a holding part, the horological movement being sandwiched between this holding part and the casing ring, the holding part being fastened on the casing ring using the first, second and third fastening means.

According to another special embodiment of the invention, the first, second and third fastening means used to fasten the holding part on the casing ring are regularly spaced angularly.

This other object of the invention also allows to guarantee perfect immobilisation of the horological movement in the casing ring and therefore to avoid any risk of damaging the parts mechanically connected with the movement. Indeed, the fact that the horological movement is fastened on the casing ring at three angularly spaced points prevents any displacement of the horological movement relative to the casing ring and therefore also relative to the watch case. The immobilisation of the horological movement relative to the casing ring is further improved by covering the horological movement by means of a holding part which is immobilised on the casing ring using the three fastening means.

According to a special embodiment of the invention, the means for fastening the horological movement and/or the holding part on the casing ring are screws or screw-flange assemblies.

According to another special embodiment of the invention, the holding part is a ring.

BRIEF DESCRIPTION OF THE FIGURES

Other features and advantages of the present invention will emerge more clearly from the detailed description which follows of an embodiment of a system for fastening a horological movement in a casing ring, this example being given in an only purely illustrative and non-limiting manner in conjunction with the appended drawing wherein.

DETAILED DESCRIPTION OF AN EMBODIMENT OF THE INVENTION

The present invention proceeds from the general inventive idea of providing a fastening system allowing to immobilise a horological movement of a watch relative to a casing ring. It is thus possible to prohibit any relative movement of the horological movement relative to the casing ring and the watch case in the event of an impact applied to the watch, so that any risk of damaging parts such as winding or correction shafts mechanically connected to the horological movement is avoided. The present invention is of very particular interest with regard to the numerous horological movements which are still fastened in the lower portion of the casing rings by means of two screws disposed at the opposite ends of a diameter of the horological movement and which define an axis around which the horological movement is capable of pivoting in the event of an impact applied to the watch. Rather than having to rethink the arrangement of the horological movement, which generates costs, the present invention teaches immobilising the horological movement in the upper portion of the casing ring using a third fastening means such as a screw which is angularly offset relative to the first two screws by means of which the horological movement is fastened in the casing ring. Any possibility of displacing the horological movement inside the casing ring is thus prohibited, so that there is no risk of damaging mechanical parts connected to the horological movement in the event of an impact applied to the watch case. It is also proposed to cover the horological movement with a holding part such as a ring and to fasten this ring on the casing ring by means of at least one screw angularly offset relative to the line which connects the screws by which the horological movement is fastened in the casing ring. In this way, the complete immobilisation of the horological movement is guaranteed in the event of an impact applied to the watch. If one chooses to fasten the horological movement in the upper portion of the casing ring by means of at least three screws angularly spaced from each other, it is even possible to avoid having to fasten the horological movement in the lower portion of the casing ring. Also in this case, the horological movement can be sandwiched between the casing ring and a holding part fastened to this casing ring by means of screws.

Figure 1:
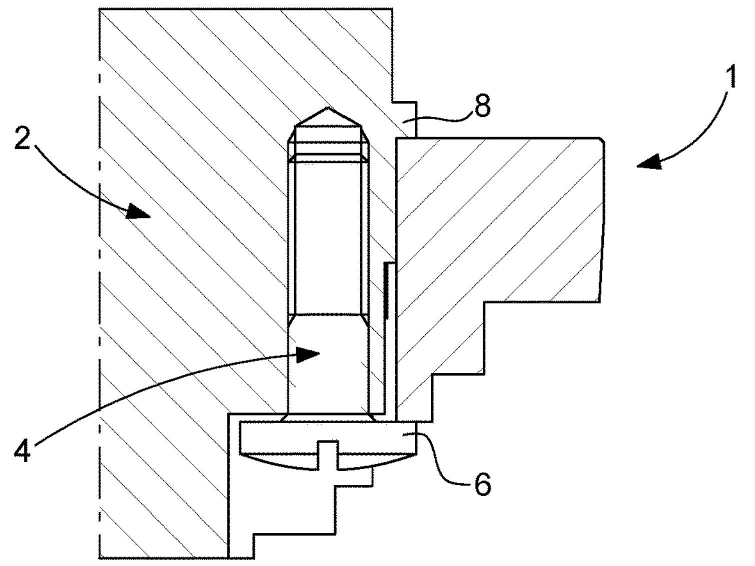
FIG. 1 is a sectional view of a watch case in the interior volume of which is arranged a casing ring which receives a horological movement fastened in the lower portion of this casing ring by means of a screw.
Figure 2:
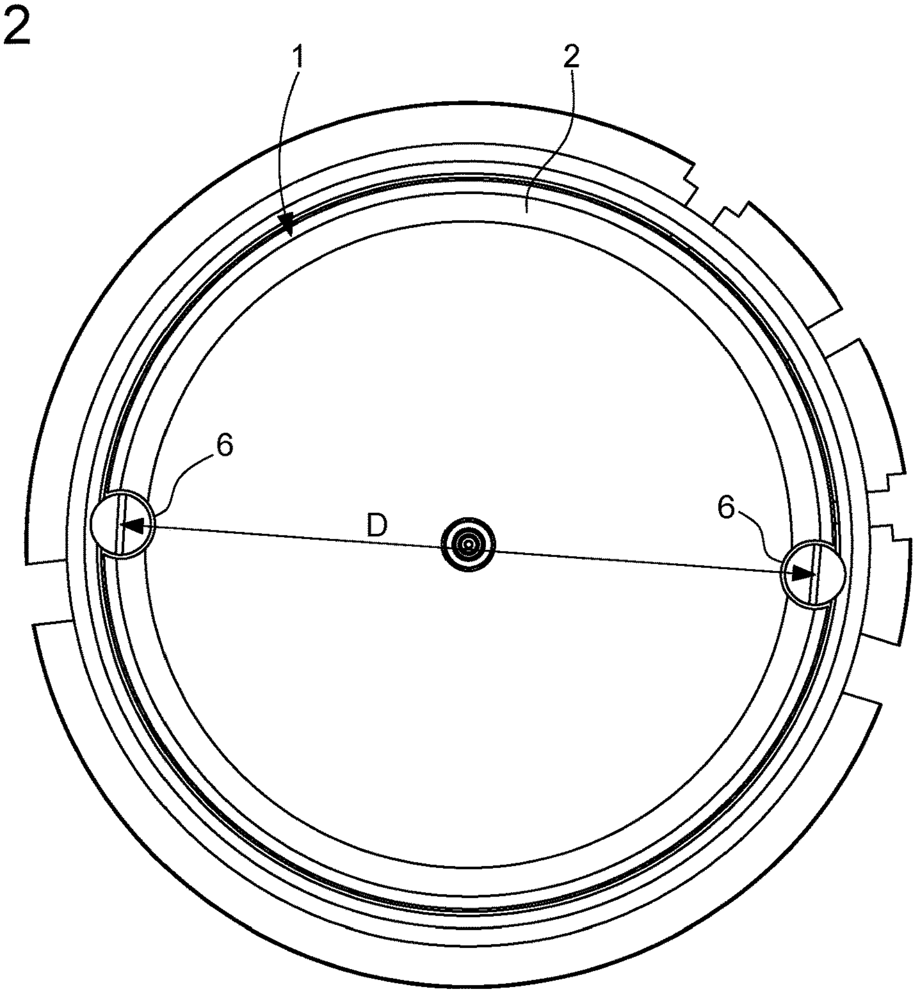
FIG. 2 is a bottom view of the casing ring of FIG. 1 in the lower portion of which is fastened the horological movement using a first and a second screw disposed at two opposite ends of a diameter of the horological movement.

FIG. 1 is a partial sectional view of a casing ring 1 wherein a horological movement 2 is housed. As can be understood by examining FIGS. 1 and 2 together, the horological movement 2 is fastened in a lower portion of the casing ring 1 using a first and a second fastening means disposed at two opposite ends of a diameter D of this horological movement 2. In a preferred but non-limiting manner, the first and second fastening means are each formed of a screw 4 provided with a head 6. The horological movement 2 which is generally circular in shape is provided with a collar 8 by which the horological movement 2 bears on the casing ring 1 as the screw 4 is screwed into the thickness of the horological movement 2. Finally, the casing ring 1 is clamped between the collar 8 and the head 6 of the two screws 4.

Fastening a horological movement in a casing ring by means of two screws disposed at the opposite ends of a diameter of this horological movement is a long known and problematic solution. Indeed, in the event of an impact applied to the watch, the diameter of the horological movement which connects the two screws together forms an axis around which the horological movement is capable of pivoting. When such an event occurs, the parts mechanically connected to the horological movement may be damaged, or even break, as is the case with the feet of the dial which is located above the horological movement, at a short distance therefrom. There are even cases where the dial bends. This is why the need has arisen to provide an additional means for immobilising the horological movement in order to prevent it from displacing inside the watch case, in particular in the event of an impact.

Figure 3:
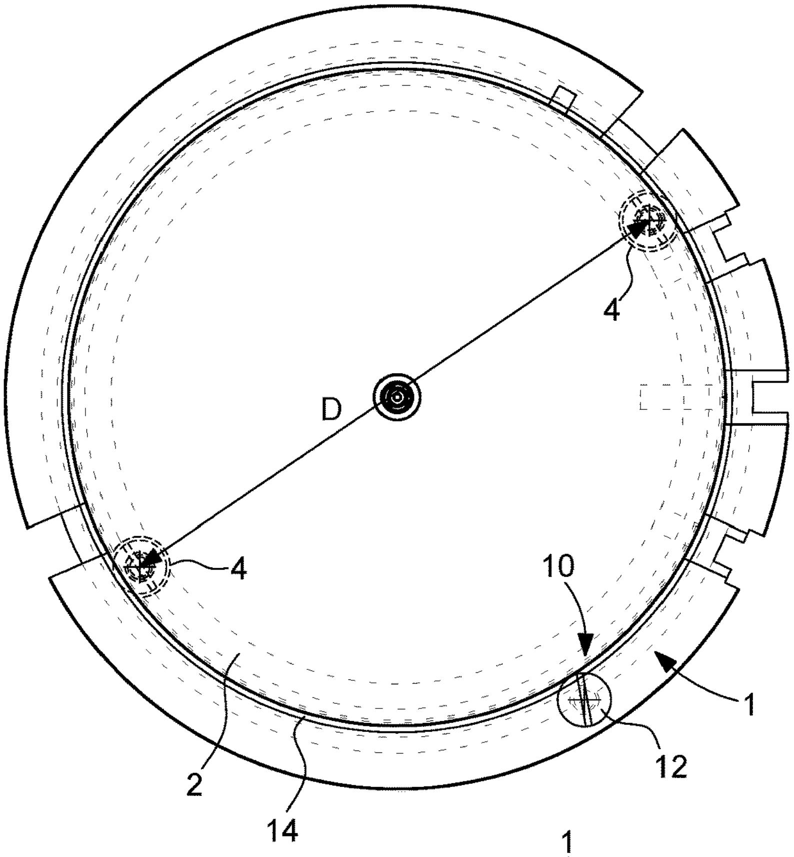
FIG. 3 is a top view of the casing ring of FIG. 2 wherein, according to the first aspect of the invention, the horological movement is immobilised using at least a third fastening means, angularly offset relative to the first and second fastening means, and fastened in the upper portion of the casing ring.

This is why, according to a first aspect of the invention, a third means for fastening the horological movement in the upper portion of the casing ring is provided. This solution is illustrated in FIG. 3 appended to the present patent application wherein it can be seen that a third fastening means such as a screw 10 is screwed into the upper portion of the casing ring 1. This screw 10 is provided with a head 12 which partially bears on a rim 14 of the horological movement 2. The screw 10 is angularly offset, for example by 90°, relative to the screws 4 which are used to fasten the horological movement 2 in the lower portion of the casing ring 1, so that perfect immobilisation of this horological movement 2 in the casing ring 1 is guaranteed.

Figure 4:
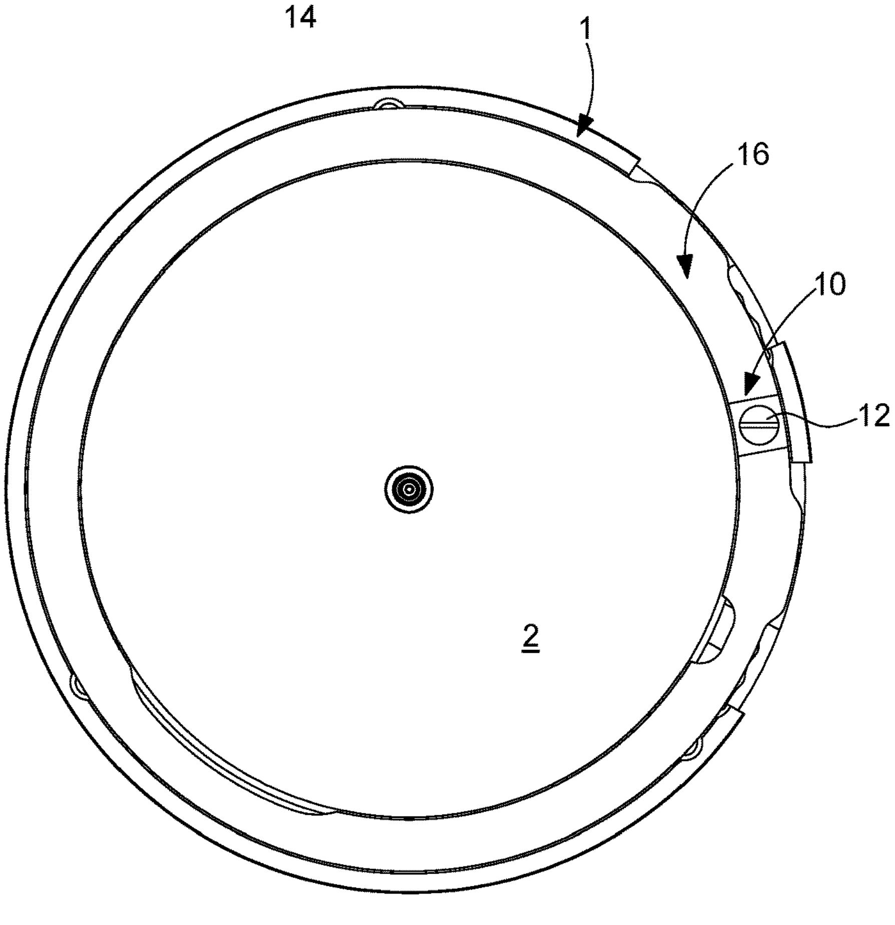
FIG. 4 is a view similar to that of FIG. 3 with the addition of a holding part between which and the casing ring is sandwiched the horological movement, this holding part being fastened on the casing ring using the third fastening means.

According to a special embodiment of the invention illustrated in FIG. 4, the horological movement 2 is covered by means of a holding part such as a ring 16 which is fastened on the casing ring 1 by means of the screw 10, so as to sandwich the horological movement 2 between this ring 16 and the casing ring 1. In this way, the immobilisation of the horological movement 2 in the casing ring 1 is further improved and the quality of the finish of the mounting of the horological movement 2 in the casing ring 1 is higher.

Figure 5:
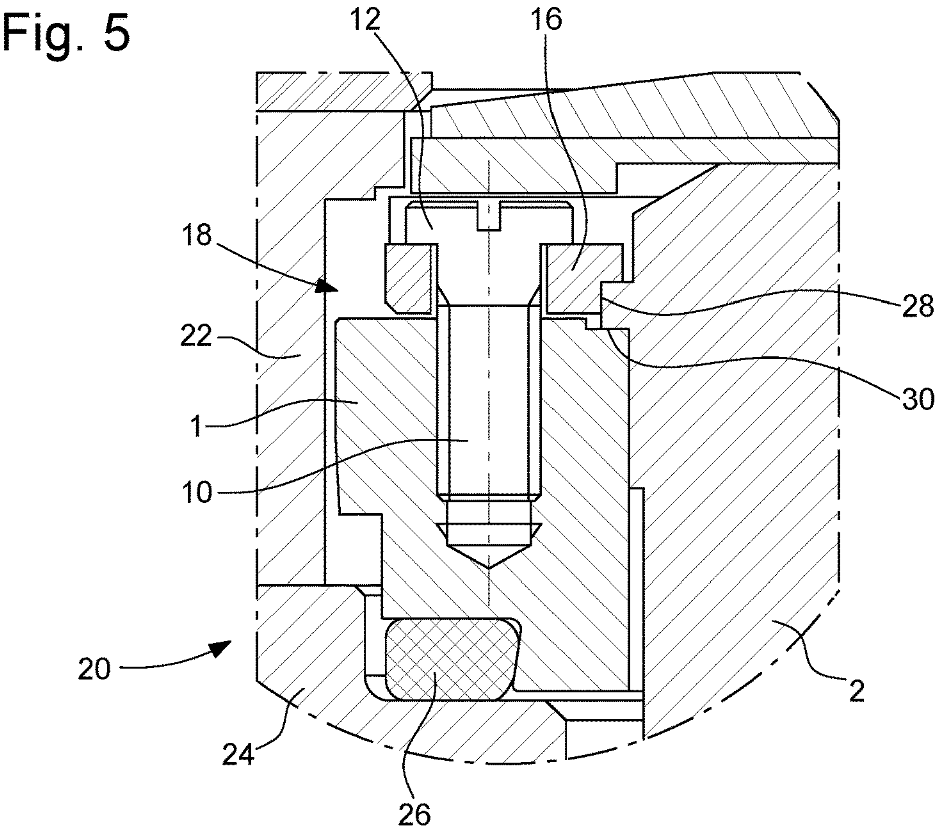
FIG. 5 is a view which illustrates in section the fastening of the horological movement in the casing ring as shown in FIG. 4.

FIG. 5 is a view which illustrates in section the fastening of the horological movement 2 in the casing ring 1 as shown in FIG. 4. As can be seen in this FIG. 5, the casing ring 1 wherein the horological movement 2 is housed is disposed in an interior volume 18 of a watch case 20 formed of a middle 22 and a back 24, with the interposition of a compression seal 26 between the casing ring 1 and this back 24.

Provided with a collar 28 by which it rests on a shoulder 30 provided on the casing ring 1, the horological movement 2 is covered by the holding part of the ring 16 type which bears on the collar 28 so as to sandwich the horological movement 2 between this ring 16 and the casing ring 1. Finally, the screw 10 is screwed into the casing ring 1 through the ring 16 against which the screw 10 bears by its head 12.

Figure 6:
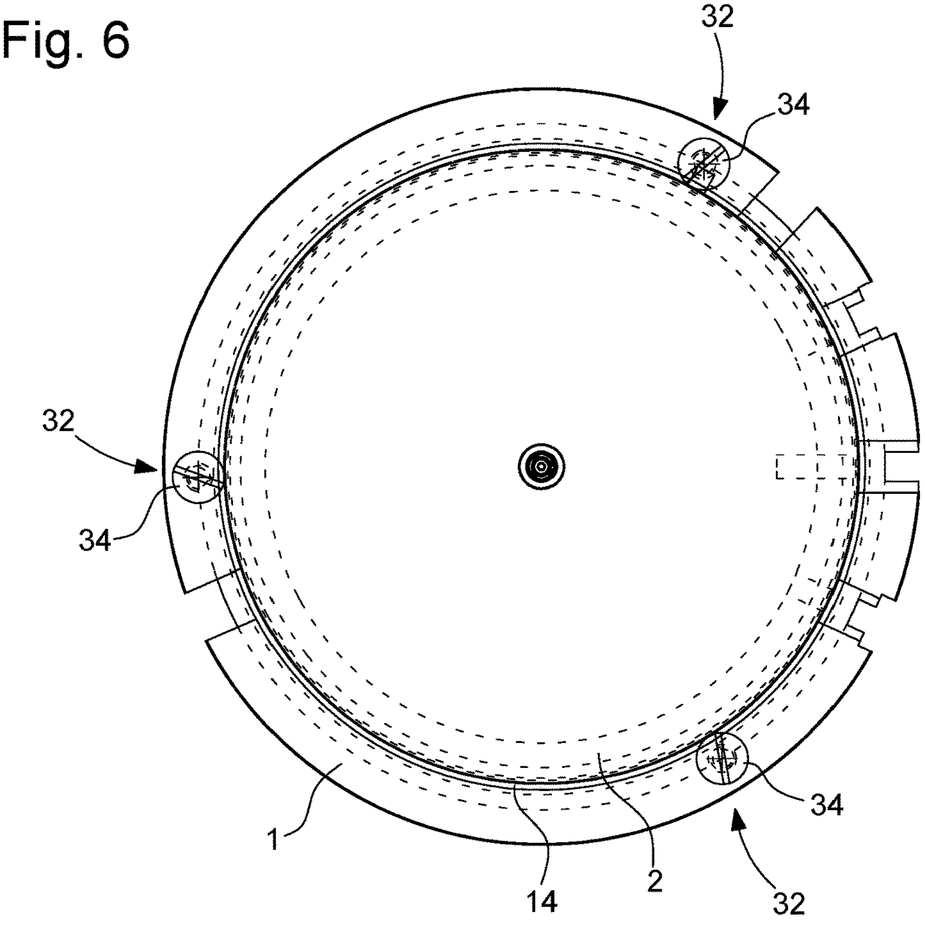
FIG. 6 is a top view of a casing ring wherein, according to the second aspect of the invention, the horological movement is immobilised using first, second and third fastening means fastened in the upper portion of the casing ring.
Figure 7:
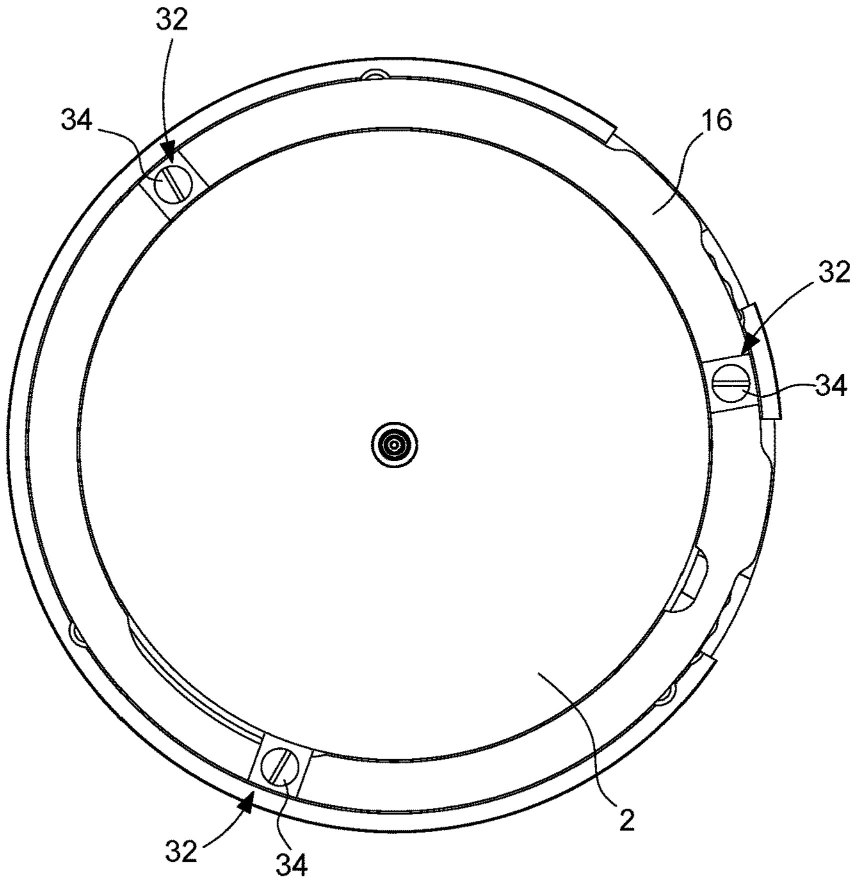
FIG. 7 is a view similar to that of FIG. 6 wherein it can be seen that the horological movement is sandwiched between a holding part and the casing ring, the holding part being immobilised on the casing ring using the first, second and third fastening means.

According to the second aspect of the invention illustrated in FIG. 6, it is possible to dispense with the fastening of the horological movement 2 in the lower portion of the casing ring 1 while, nevertheless, guaranteeing a perfect immobilisation of the horological movement 2 in the casing ring 1. To this end, provision is made to fasten the horological movement 2 in the casing ring 1 using at least a first, a second and a third fastening means such as screws 32 which are screwed into the upper portion of the casing ring 1. These screws 32 are angularly spaced from each other, preferably regularly. They are each provided with a head 34 which partially bears on the rim 14 of the horological movement 2. It is therefore understood that, fastened in the casing ring 1 at three angularly spaced points, any displacement of the horological movement 2 in the casing ring 1 is made impossible. To improve the quality of the finish of the interlocking of the horological movement 2, it is possible, as shown in FIG. 7, to sandwich the horological movement between a holding part such as a ring 36 and the casing ring 1, the ring 36 being fastened to the upper portion of this casing ring 1 using the three screws 32.

Figure 8:
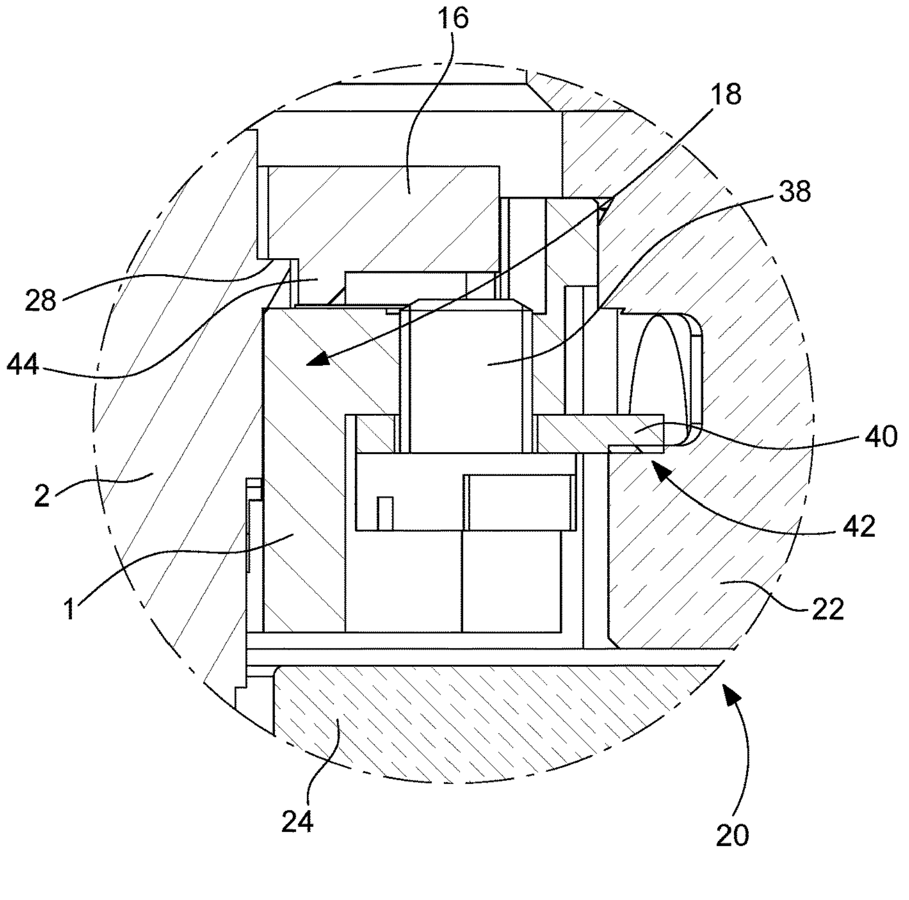
FIG. 8 illustrates the fastening of the horological movement and the casing ring in the watch case by means of screw-flange fastening assemblies.

Finally, FIG. 8 illustrates the mounting of the assembly formed by the casing ring 1 and the horological movement 2 in the watch case 20. It is seen in this FIG. 8 that a screw 38 is screwed into the casing ring 1 with the interposition of a flange 40 which bears on a shoulder 42 formed in the middle 22. It can be seen on the other hand that the ring 16 which bears on the collar 28 of the horological movement 2 also bears by a lower edge 44 on the casing ring 1.

It goes without saying that the present invention is not limited to the embodiment which has just been described and that various modifications and simple variants can be considered by the person skilled in the art without departing from the scope of the invention as defined by the appended claims.

NOMENCLATURE

1. Casing ring
2. Horological movement
D. Diameter
4. Screw
6. Head
8. Collar 8
10. Screw
12. Head
14. Rim
16. Ring
18. Interior volume
20. Watch case
22. Middle
24. Back
26. Compression seal
28. Collar
30. Shoulder
32. Screw
34. Head
36. Ring
38. Screw
40. Flange
42. Shoulder
44. Lower edge

The invention claimed is:

1. A system for fastening a horological movement of generally circular shape in a watch case, said fastening system comprising:
- a casing ring wherein the horological movement is disposed, the casing ring extending between an upper portion and a lower portion; and
- a holding part extending around an entire circumference of the horological movement,
- wherein the horological movement is sandwiched between said holding part and the casing ring,
- wherein the horological movement is fastened in the lower portion of the casing ring using a first and a second fastening means disposed at two opposite ends of a diameter of the horological movement, and
- wherein at least a third fastening means, angularly offset relative to the first and second fastening means, is fastened directly into the upper portion of the casing ring, thereby allowing the horological movement to be blocked in the casing ring.

2. The fastening system according to claim 1,
- wherein each of the means for fastening the horological movement and/or the holding part on the casing ring are screws.

3. The fastening system according to claim 1,
- wherein the holding part being fastened on the casing ring using the at least a third fastening means.

4. The fastening system according to claim 3, wherein the holding part is a ring.

5. The fastening system according to claim 1, wherein the third fastening means is angularly offset by 90° relative to the first and second fastening means disposed at the opposite ends of the diameter of the horological movement.

6. A system for fastening a horological movement of generally circular shape in a watch case, said fastening system comprising:

a casing ring wherein the horological movement is disposed, the casing ring extending between an upper portion and a lower portion; and a holding part extending around an entire circumference of the horological movement, wherein the horological movement is sandwiched between said holding part and the casing ring, wherein the horological movement is blocked in the casing ring with a first, a second and a third fastening means which are angularly spaced and fastened directly into the upper portion of said casing ring.

7. The fastening system according to claim 6, wherein the first, second and third fastening means are screws and the screws fasten the horological movement and the holding part on the casing ring.

8. The fastening system according to claim 6, wherein the holding part is a ring.

9. The fastening system according to claim 6, wherein the first, second and third means are regularly spaced angularly.

* * * * *